Jan 6, 1931.  F. C. WAPPLER  1,787,709
HIGH FREQUENCY SURGICAL CUTTING DEVICE
Filed June 11, 1928
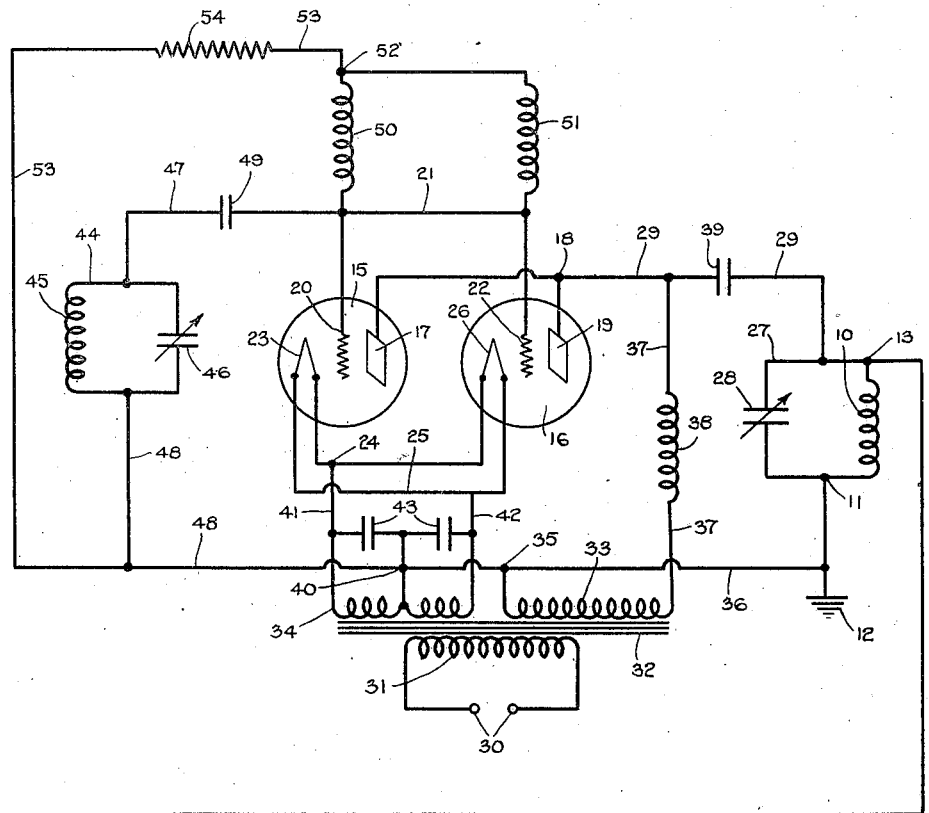
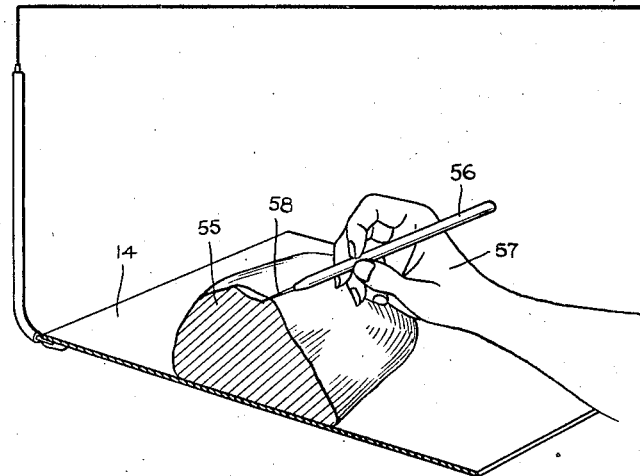
INVENTOR
Frederick Charles Wappler
BY
ATTORNEY Patented Jan. 6, 1931

1,787,709

UNITED STATES PATENT OFFICE

FREDERICK CHARLES WAPPLER, OF NEW YORK, N. Y.

HIGH-FREQUENCY SURGICAL CUTTING DEVICE

Application filed June 11, 1928. Serial No. 284,541.

My present invention relates generally to high-frequency electrical devices, and has particular reference to a method and apparatus for harnessing the capabilities of high-frequency electrical currents to the purposes of surgery.

It has been known for a long time that the passage of a high-frequency current through a suitable subject, for example, an organic object like the human body, will produce a heating effect; and that if the current is made to pass through an extremely small area, the concentration thereof or current intensity, will have the effect of cutting the subject. It is highly probable that this cutting phenomenon is one of burning or searing because it is accompanied by a very rapid succession of minute sparks, the emanation of a slight amount of smoke, and because the treated tissue assumes an appearance similar to that produced by ordinary burning.

I have proceeded on this assumption and have ascertained by experiment that the intensity of the cutting phenomenon is greatly increased in proportion to the frequency of the alternating current. I have also ascertained that when this frequency is increased beyond certain ranges, so that it lies higher than ten million cycles per second, an exceptionally great efficiency, and other advantages, are achieved.

It is accordingly one object of my present invention to provide a device for establishing and maintaining a high-frequency alternating current of the foregoing character and in rendering such current available for passage in the contemplated manner through a suitable subject.

Devices of this general character have heretofore proven to be unusually expensive from a manufacturing standpoint. It is another object of my invention to provide an apparatus which embodies a maximum of simplicity and which consequently involves a manufacturing expense which is exceptionally low. For example, whereas the expense of manufacture has heretofore involved at least several hundred dollars, my present apparatus can be constructed for a sum in the neighborhood of $40.00.

It is well known also that the employment of such a device imposes a number of variable factors upon the apparatus, and that the smooth and efficient operation of the device necessitates the elimination of these factors from influencing the uniform maintenance of the desired high-frequency current. In other words, when such a current is passed through a suitable subject, the subject embodies not only a considerable amount of electrical capacity, but it also constitutes a direct passage for the current, and it is important that these variable factors be rendered powerless to affect the operation of the device.

Accordingly, it is another object of my invention to provide an arrangement which is exceptionally stable and which will not balk under operating conditions, which are the conditions under which smooth continuation of efficient operation is most highly to be desired.

Concurrently with simplicity of structure and small expense of manufacture and operation, it is an object of my invention to provide a device whose employment has been greatly simplified. More particularly, it is an object to provide an apparatus by means of which an operator or surgeon may wield a suitable cutting instrumentality or tool in the customary manner, i. e., unaffected by any association of the tool with any device or apparatus of which it may constitute a part.

In a contemplated form of the invention, a suitably constructed operating table is provided with the necessary electrical apparatus which may be contained in a suitable casing or the like in the under part of the table; and my invention is such that a surgeon may approach the patient on the operating table in the same manner as he does at present, and may perform the operations of the present character in the usual unimpeded manner by a tool wholly independent of the table and the apparatus, and wielded by the surgeon in a highly expeditious manner.

In accordance with my invention, the subject to be operated upon is so associated with the high-frequency device that an attenuated tool, similar to the instruments usually employed by surgeons, and wholly independent of and disconnected from the device itself, may be grasped and wielded by the surgeon in exactly the same unimpeded manner as he now grasps and wields a knife or similar tool. My invention is such as to impart to this independent and freely manipulable tool a cutting capability which it otherwise would not possess, which capability is far superior to the sharpest type of knife or the like because of the fact that a cutting phenomenon is effected by the predetermined harnessing of the characteristics and properties of an exceptionally high-frequency alternating current.

For the attainment of the foregoing objects and such other objects as may hereinafter appear or be pointed out, I have constructed a device embodying the features of my invention and illustrated in the accompanying drawing which represents in the upper portion thereof the diagrammatical co-operative arrangement of the electrical elements thereof, and which illustrates, in the lower portion thereof, the manner in which the device is actually employed.

I provide an inductance coil 10 having one end 11 thereof grounded as at 12 and having a relatively remote point, such as the opposite end 13, in direct connection with a relatively large electrode 14 adapted to underlie the subject to be operated upon.

I provide means for establishing and maintaining an alternating current of a frequency exceeding ten million cycles in the coil 10. This exceedingly high frequency has this advantage among others, that the actual difference in potential between the points 11 and 13 is exceptionally low and is what may be termed a "safe" voltage. By a "safe" voltage I refer to one which produces no shock in the human body and which produces only a mild warming effect if it is applied to relatively large areas of the body. For example, when the electrode 14 is insulated from the ground, as by simply laying it upon an ordinary piece of paper or the like, the finger may be applied to the plate 14 without any other effect except to produce a mild degree of warmth in the finger.

The means which I provide for establishing and maintaining the high frequency current in the coil 10 consists of the pair of three-element thermionic tubes 15 and 16, and the associated elements presently to be described.

The tubes are connected in absolute parallelism. For example, the plate 17 of the tube 15 is directly connected at 18 with the plate 19 of the tube 16; the grid element 20 of the tube 15 is directly connected, as at 21, with the grid element 22 of the tube 16; and the filament element 23 of the tube 15 is directly connected as at 24 and 25 with the filament element 26 of the tube 16.

An oscillating circuit is connected to the plates 17 and 19, and this oscillating circuit, represented by the reference numeral 27, includes the coil 10 as a portion thereof. A condenser 28, which I have shown as variable, serves as the other portion of the oscillating circuit 27; and the connection with the plates is effected by the lead or wire 29.

The input energy is preferably the ordinary commercial alternating current of one hundred ten volts and sixty cycles. This current is impressed across the terminals 30 of the primary winding 31 of a suitable step-up transformer 32. The secondary winding of the transformer consists of the two parts 33 and 34, the part 33 having an A. C. voltage of approximately one thousand volts induced therein, and the part 34 having a voltage of approximately eight volts induced therein.

One end 35 of the secondary winding 33 is grounded by means of the lead 36. The opposite end of the winding 33 is connected by the lead 37 to the plates 17 and 19 of the tubes 15 and 16.

A power choke 38 in the lead 37 prevents high frequency oscillations from passing back to the winding 33; and a blocking condenser 39 in the lead 29 prevents the low frequency current from the transformer from passing to the oscillating circuit 27.

The winding 34 is designed to supply the necessary current for the filaments 23 and 26. Accordingly, the center of the coil 34 is grounded as at 40, one end of the coil 34 is connected by the lead 41 to the terminal 24 of the filaments, and the other end of the coil 34 is connected by the lead 42 to the terminal 25 of the filaments. I prefer to arrange a pair of condensers 43 on opposite sides of the central tap 40 between the latter and the leads 41 and 42 respectively.

The circuit I have provided is a "self-exciting" circuit, as will be readily appreciated by those conversant with the art. To achieve stability, I provide means for independently tuning the grid elements of the tubes into resonance with the oscillating circuit 27 connected to the plate elements of the tubes. For this purpose I provide a tunable second oscillating circuit 44 in connection with the grids 20 and 22. More particularly, this circuit comprises an inductance coil 45 and a variable condenser 46. One end of the circuit is connected by the lead 47 to the lead 21 common to both grid elements; and the other end of the circuit 44 is connected by means of the lead 48 to the ground. A blocking condenser 49 is preferably arranged in the lead 47.

To prevent the high frequency oscillation from the grids from passing back to the transformer, I provide a pair of chokes 50 and 51, one set of ends thereof being connected to the common lead 21, and the other set of ends being connected at 52 to the lead 53 which joins the lead 48 and is thus connected to the ground. A suitable grid leak resistance 54 is arranged in the lead 53.

By the employment of the two tubes arranged in parallel, I obtain twice the energy output that I would obtain from one alone, and I also assure a continuation of operation even though one tube should cease to operate properly. By means of my construction, I am enabled to employ tubes of the ordinary 15-watt variety, the inexpensive nature of which is well known.

By means of the independently tuned grid, I enhance the self-exciting characteristics of the arrangement and I also greatly increase the stability of the entire device.

I achieve great simplicity, with its correspondingly small expense, and I produce the desired high frequency, by means of the particular selection and proportionment of parts whereby the inductance coils 10 and 45 embody no more than two to six turns, preferably two; and whereby the condensers 28 and 46 have capacities of approximately .00003 microfarads when the device is employed. Although I have shown the condenser 28 as variable, it will be understood that the variability is provided merely for purposes of initial tuning when the device is manufactured. Once adjusted, the condenser 28 is for all practical purposes a fixed condenser; and a truly fixed condenser may actually be employed, if desired, in place of the variable one illustrated.

A device constructed as illustrated and described can be set into operation with great ease so that a current of at least ten million cycles will be established and maintained in the inductance coil or output coil 10. The self-excitation of the arrangement will produce oscillation in the tubes 15 and 16, and by properly tuning the circuit 44, a condition of stability will be attained, which stability will remain unaffected by the variable factors imposed by employment of the device. The energy utilized is extremely small because of the fact that the cutting intensity has been greatly increased by the high frequency induced in the coil 10. In fact, this smallness of energy required for efficient operation permits me to employ the low-rating tubes 15 and 16 mentioned hereinbefore.

For purposes of illustrating the manner in which my invention may be employed, I have shown a piece of meat or other suitable subject 55 upon the electrode 14. By means of this arrangement, the subject 55 is brought into direct electrical connection with a live portion or point of the inductance coil 10. A suitable tool 56 is grasped by the hand 57 of an operator who is at the usual ground potential. The end of the tool 56 is provided with the attenuated point or operative portion 58, the latter having an extremely small cross-section and serving in this way to concentrate the current that passes therethrough.

When the device is employed, it is necessary only to set the device into oscillation, to support the subject 55 upon the electrode 14 or its equivalent, and thereupon to grasp and wield the electrode-tool 56 in the same manner as a similar cutting tool is customarily wielded by a surgeon. As the portion 58 is applied to the point or points on the subject which are to be cut, a continuous sparking results, and the tool passes through the subject with hardly any pressure and serves thereby to effect any desired cutting. I have been enabled satisfactorily and uniformly, and without any impairment of operation or balking of the device, to cut a suitable subject at the rate of one-half to two inches per second at a depth of approximately one-eighth of an inch.

I am fully aware that the properties of high frequency currents have been employed heretofore for similar surgical purposes, but the devices heretofore used have been not only much more expensive than the present device but have generally proven unsatisfactory because of impairment of uniform operation under working conditions. I attribute the success and efficiency of my present arrangement to the design and arrangement which produces extremely high frequencies, and to the extreme stability which the construction and arrangement of parts provides.

Time, it will be seen that I have provided a device which is not only far simpler than devices heretofore employed for this purpose, which is not only far less expensive than has heretofore been deemed possible, but which operates in a uniform and stable manner with a minimum complexity and an extremely small amount of input energy. Furthermore, it will be observed that I have devised an extremely efficient method of harnessing high frequency phenomena to the purposes contemplated, the total independence of the electrode tool serving to greatly facilitate utilization of the device in a manner which will and should immediately appeal to surgeons and others engaged in performing cutting operations. I might state that the free and unimpaired handling and use of the tool by the operator greatly increases the facility and ease with which extremely delicate operations may be performed.

In a contemplated embodiment of the invention, an operating table is provided in such a manner that the portion upon which the patient rests constitutes a relatively large electrode of the character indicated at 14. The table is preferably set upon glass cups or is similarly insulated from the ground, and the electrical device represented in the upper portion of the figure is housed in a suitable casing or box beneath the upper portion of the table. The surgeon may then with great ease perform operations and take whatever procedural steps may be necessary in the usual manner, and he may at the proper time switch on the electrical device and thereupon continue his operation by the electrical means described. It is seldom necessary for the surgeon to touch the body of the patient, but wherever necessary forceps or similar instruments of insulating material may be employed without impairing the usual facility of operation. It is probable that ordinary rubber gloves may in certain cases be satisfactory. Where extremely delicate operations are performed in relatively inaccessible places, the absence of wires, connections, and similar obstructions is conducive to great efficiency.

It will be obvious that changes in the details herein described and illustrated for the purpose of explaining the nature of my invention may be made by those skilled in the art without departing from the spirit and scope of the invention as expressed in the appended claim. It is therefore intended that these details be interpreted as illustrative and not in a limiting sense.

Having thus described my invention and illustrated its use, what I claim as new and desire to secure by Letters Patent—

A high-frequency cutting device comprising an oscillating circuit, means for establishing and maintaining a high-frequency current of the order of ten million cycles in said circuit, said circuit including an inductance coil whereof one end is grounded, a relatively large electrode connected to a live point on the coil, said electrode being insulated from the ground and adapted to underlie the subject to be cut, and an attenuated electrode-tool wholly independent of and disconnected from said circuit and designed to be grasped and wielded by an operator at ground potential and to be brought into engagement with the object to be cut, the frequency of said current being sufficiently high to maintain the operator at ground potential despite his total disconnection from said circuit.

In witness whereof, I have signed this specification this 31st day of May, 1928.

FREDERICK CHARLES WAPPLER.